R. E. WAGELEY, DEC'D.
F. R. CORNWALL, ADMINISTRATOR.
CALCULATING MACHINE.
APPLICATION FILED AUG. 21, 1907.
1,030,975.
Patented July 2, 1912.
7 SHEETS—SHEET 4.
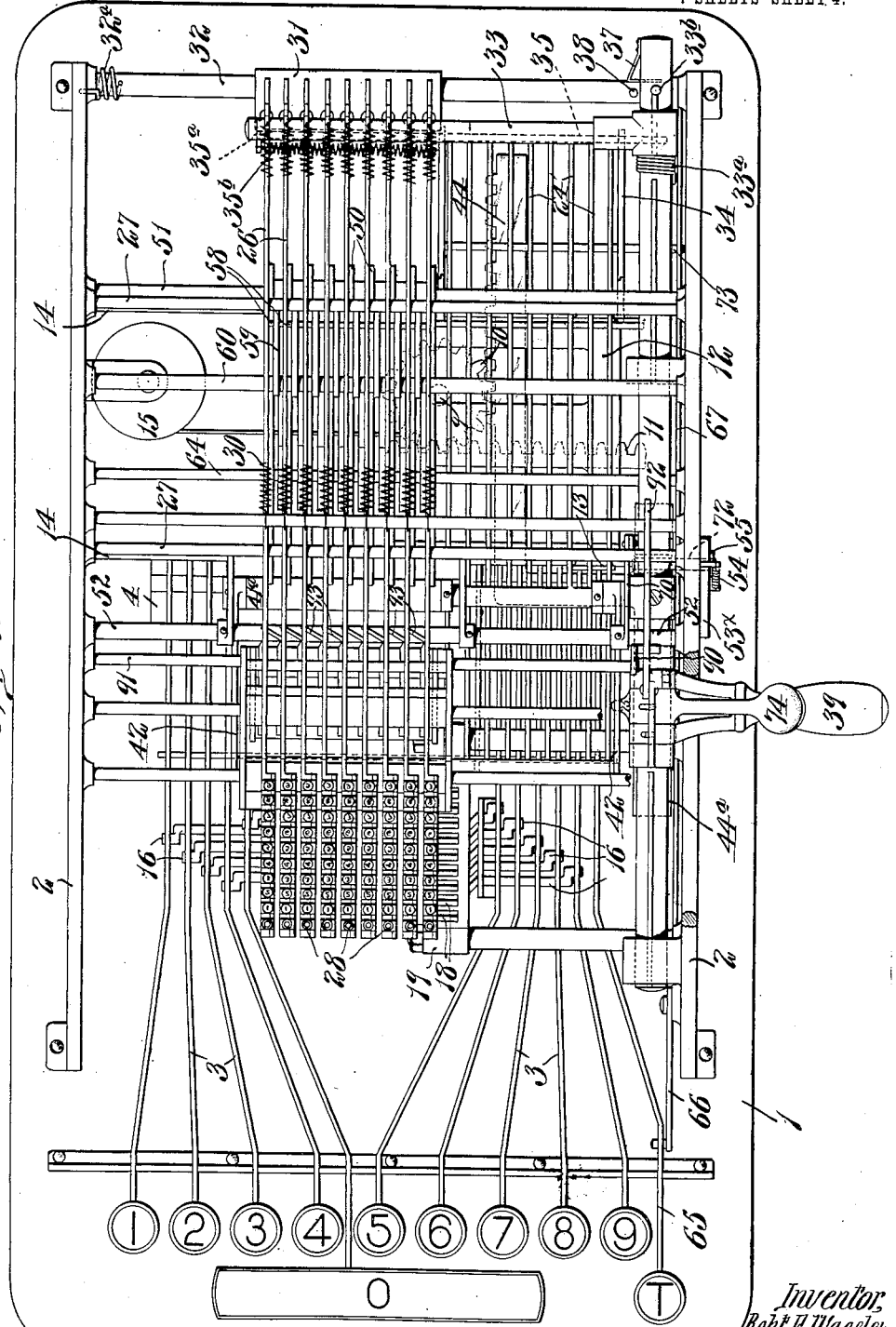
Witnesses:
Geo. R. Ridson
A. J. McCauley
Inventor
Robt. E. Wageley
(Deceased)
By F. R. Cornwall
Administrator

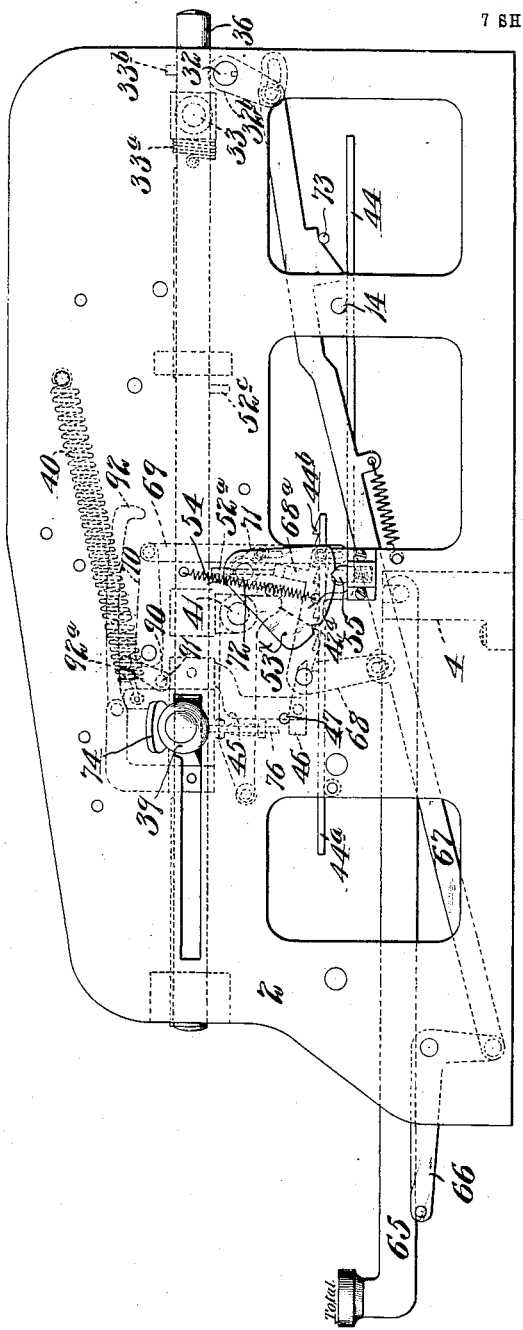

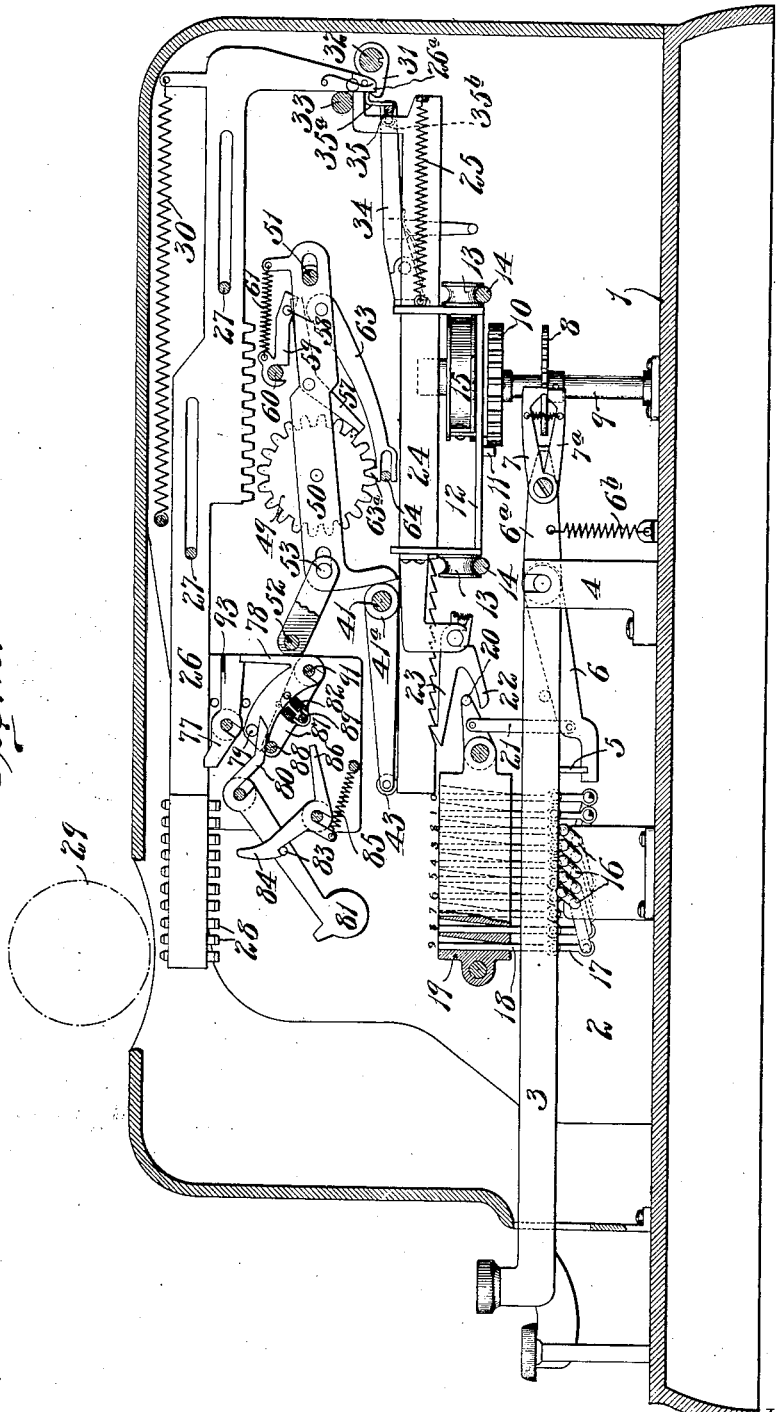

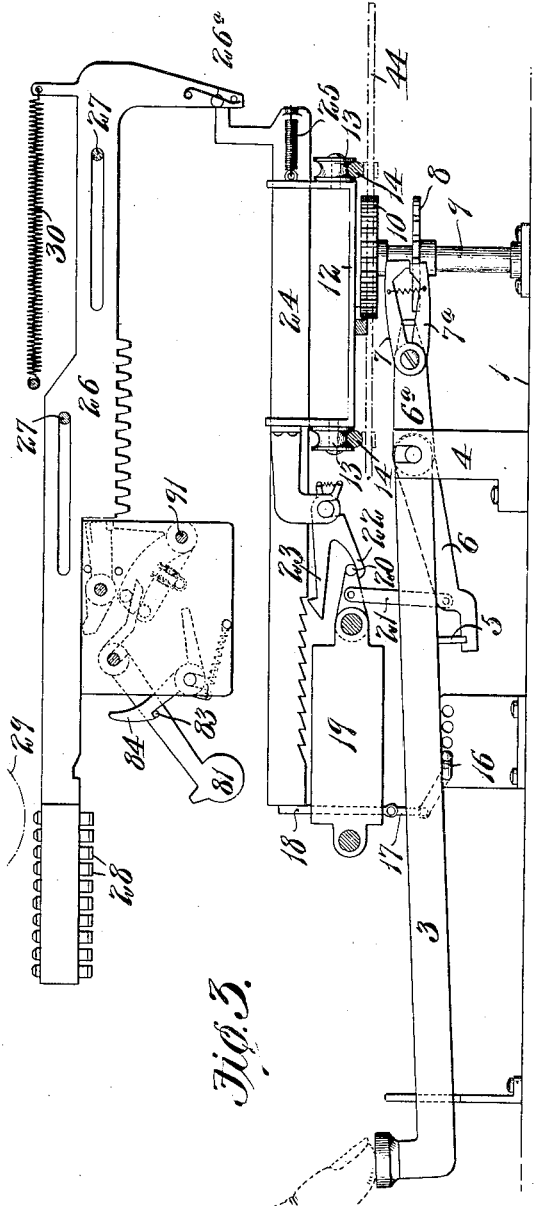

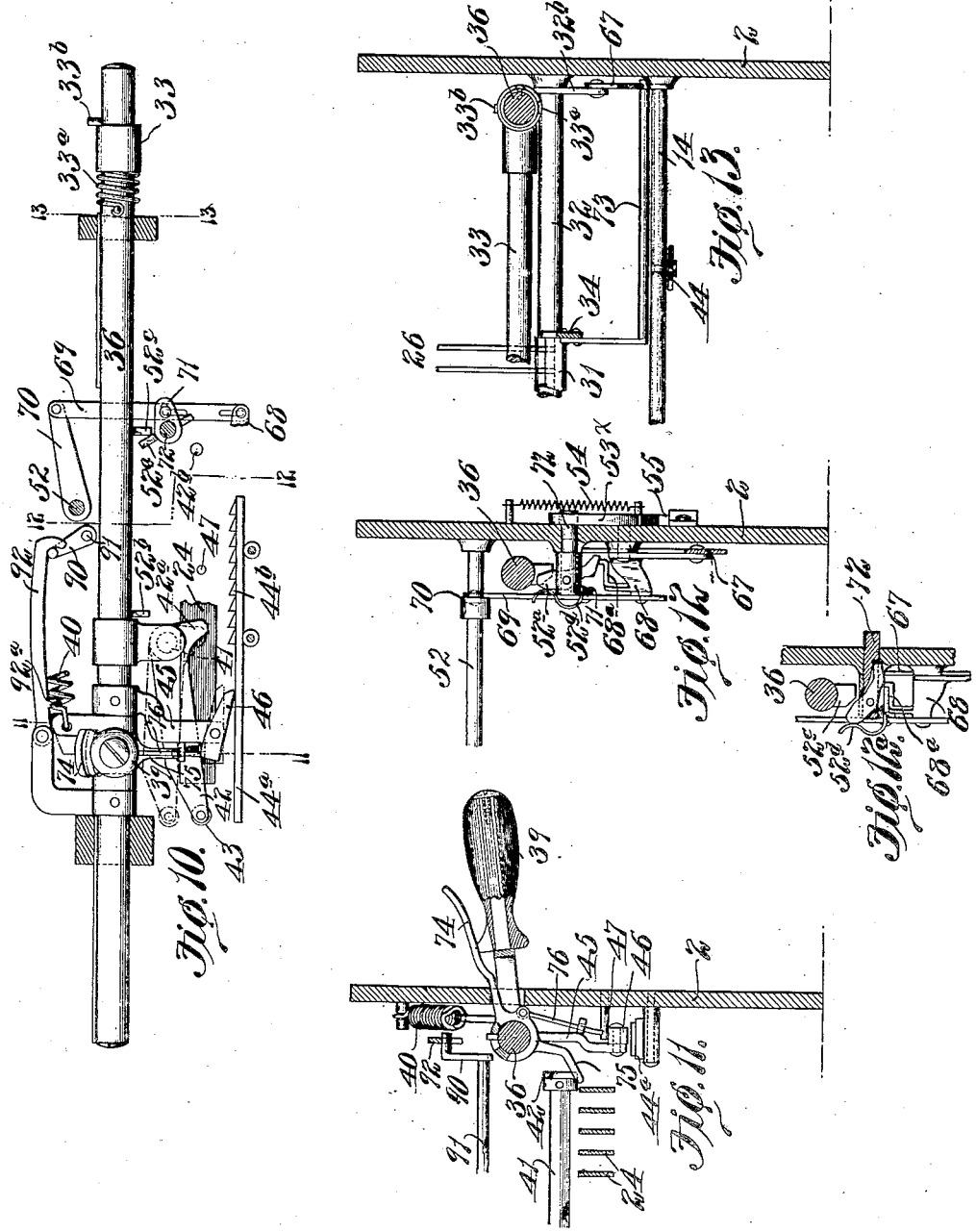

R. E. WAGELEY, DEC'D.
F. E. CORNWALL, ADMINISTRATOR.
CALCULATING MACHINE.
APPLICATION FILED AUG. 21, 1907.
1,030,975.
Patented July 2, 1912.
7 SHEETS—SHEET 6.
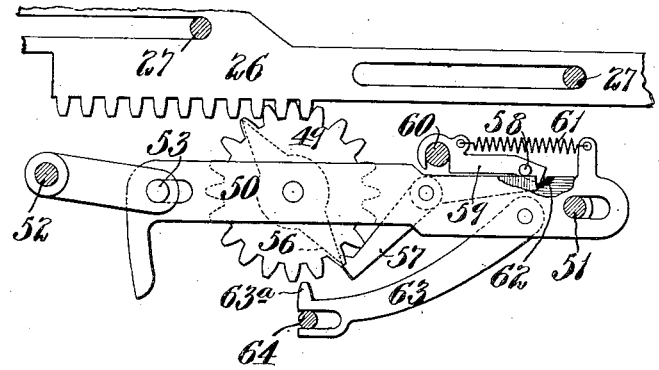
Fig. 14.
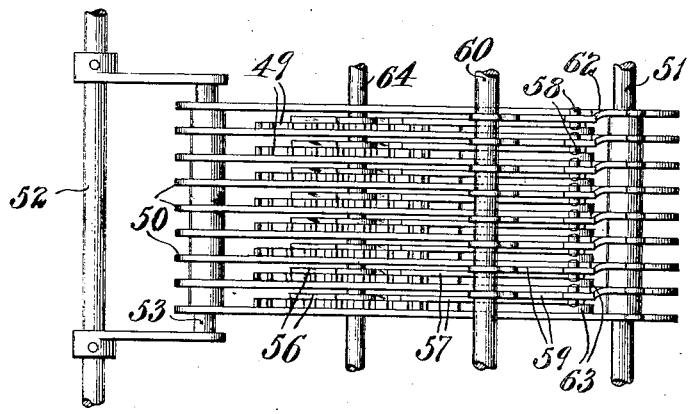
Fig. 15.
Fig. 16.
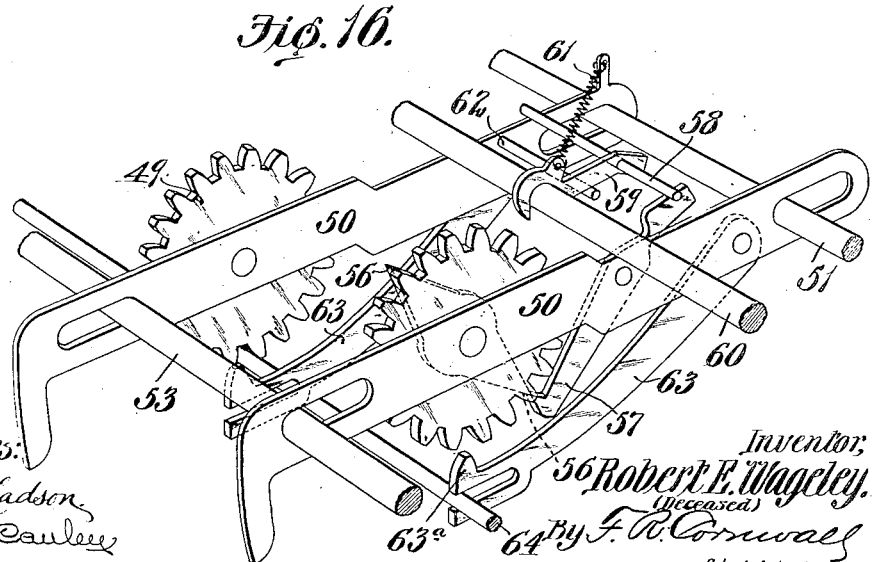
Witnesses:
Geo. R. Ladson
A. J. McCauley
Inventor:
Robert E. Wageley
(Deceased)
By F. E. Cornwall
Administrator.

R. E. WAGELEY, DEC'D.
F. R. CORNWALL, ADMINISTRATOR.
CALCULATING MACHINE.
APPLICATION FILED AUG. 21, 1907.
1,030,975.
Patented July 2, 1912.
7 SHEETS—SHEET 7.
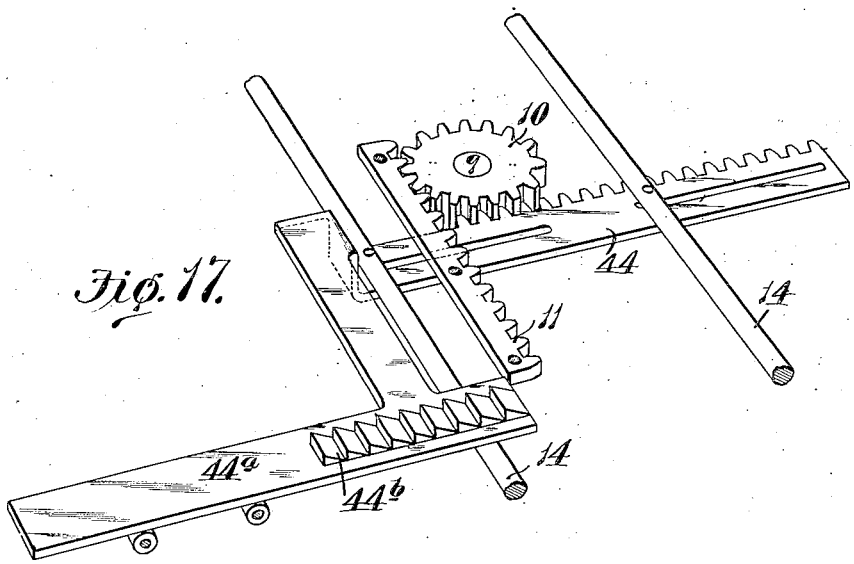
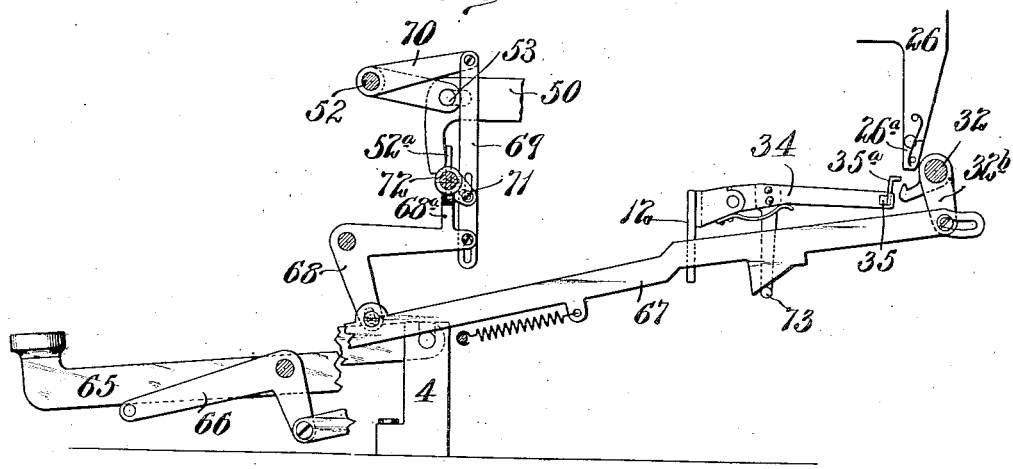

UNITED STATES PATENT OFFICE.

FREDERICK R. CORNWALL, OF ST. LOUIS, MISSOURI, ADMINISTRATOR OF ROBERT E. WAGELEY, DECEASED, ASSIGNOR TO MOON-HOPKINS BILLING MACHINE COMPANY, OF ST. LOUIS, MISSOURI, A CORPORATION OF MISSOURI.

CALCULATING-MACHINE.

1,030,975. Specification of Letters Patent. Patented July 2, 1912.

Application filed August 21, 1907. Serial No. 389,579.

*To all whom it may concern:*

Be it known that ROBERT E. WAGELEY, deceased, late a citizen of the United States, did invent a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1 is a side elevational view showing the frame and part of the mechanism of the machine; Fig. 2 is a vertical longitudinal sectional view through the machine; Fig. 3 is a side elevational view illustrating the position of certain parts when a key is depressed; Fig. 4 is a detail view of one of the key stops; Fig. 5 is a detail view illustrating the locking mechanism coöperating with the stop bars; Fig. 6 is a side elevational view of the escapement mechanism; Fig. 7 is a similar view showing the escapement mechanism in a changed position; Fig. 8 is a top plan view of the escapement mechanism; Fig. 9 is a top plan view of the machine with the casing removed; Fig. 10 is a detail view of the actuating bar and its connected parts; Fig. 11 is a cross sectional view showing the actuating bar and certain of its connected parts, on the line 11—11 of Fig. 10; Fig. 12 is a similar view on the line 12—12 of Fig. 10; Fig. 12ᵃ is a view similar to Fig. 12 but showing the parts in different positions; Fig. 13 is a similar view on the line 13—13 of Fig. 10; Fig. 14 is a detail side elevational view of the register; Fig. 15 is a top plan view of the register; Fig. 16 is a conventional illustration showing two of the register wheels and the method of carrying from a wheel of lower order to a wheel of higher order; Fig. 17 is a detail view of the means for compelling a full stroke of the actuating bar; and Fig. 18 is a side elevational view of the total key and its connections.

This invention relates to a new and useful improvement in calculating machines, the object being to simplify the construction of a machine of this character and reduce its cost of manufacture, the various parts of the machine being stamped from sheet metal.

The machine illustrated in the accompanying drawings relates to that class of calculating machines wherein there is a traveling carriage. This traveling carriage supports a series of slide bars which are successively under control of a series of stationarily arranged stops, so that when a slide bar is positioned it is locked and moved from under control of the stationarily-mounted key-positioned stop pins, and in the path of projections on a series of rack bars. Thus as the slide bars are successively positioned and locked in position the carriage advances them successively in the paths of the rack bars, each step in advance placing the first slide bar in the path of a rack bar of higher order. When the keys have been successively struck to introduce the proper example into the machine, and the carriage with its slide bars locked in the position determined by the controlling keys advanced so that the slide bars will coöperate with the rack bars of proper order, a handle, preferably located at the side of the machine, is pulled by manual power (or a motor may be employed to operate the machine if desired), so as to operate a bar, which bar coöperates with the several devices of the machine to accomplish the following: first, release the rack bars so that said rack bars will be moved to a position as determined by the slide bars in their respective paths; second, release appropriate type hammers so that a printing impression can be made from the type carried at the forward end of the rack bars; and, third, engage the register wheels with the rack bars, all of this occurring on the forward movement of the operating handle. On the return movement of the operating handle, the carriage and its positioned slide bars are restored to normal position; the rack bars are likewise restored; the type hammers are restored; and, finally, the register wheels are disengaged from the rack bars, when the machine is in readiness for another operation. To obtain a total, a total key is depressed, which causes the register wheels to engage with the rack bars before the rack bars are released and permitted to move forward. The register wheels, of course, rotate until they are arrested by the zero stops, after which and at the end of the forward movement of the operating bar the type hammers are released to make a record of the total. Rearward movement of the operating handle in taking a total may either restore the rack bars when in engagement with the register wheels so as to retain the total in the machine, which, under the circumstances, may be designated as a sub-total, or the total key may be permitted to rise, which will disengage the register wheels from the rack bars so that said register wheels will stand at zero and the machine be cleared before the rack bars are restored. To repeat a number in the machine, that is, add the same number introduced into the machine a number of times in the register, a repeat key arranged on the operating handle is depressed, and the operating handle pulled the necessary number of times after an example has been introduced into the machine through the keys. The repeat key prevents the slide bar carriage from being restored on the rearward movement of the operating bar, and consequently the positioned slide bars successively coöperate with the rack bars.

*The keys and key stops.*—In the drawings, 1 indicates a base upon which are arranged two side frames 2. 3 are the digit keys numbered from "1" to "9" inclusive, see Fig. 9, whose bars are provided with appropriate pivots arranged in a suitable bearing bracket 4 mounted on the base, see Figs. 2 and 3. 5 indicates a transversely arranged bar under the key bars 3, which bar 5 is mounted upon a lever 6. Each of the digit keys 3 has its bar coöperating with the crank end of a rock shaft 16, see Fig. 4. The inner end of each rock shaft is provided with an arm connected by a link 17 to a stop 18. The stops 18 of the several digit keys are arranged in proper order in a guiding frame 19, which guiding frame is preferably provided with tapering openings so as to accommodate the arcuate movement of the stops 18. There are ten stops 18 capable of being positioned respectively by the zero and the digit keys. The zero key, which is practically a space key, positions the rearmost stop which is coincident with the particular slide bar under control of the stops, and consequently the slide bar will not move forward when the zero key is operated. If, however, any of the digit keys are operated, the second, third, fourth, and so on, up to the ninth stop will be positioned, and the particular slide bar under control of the stops will be moved forward until arrested by the positioned stop.

*The escapement.*—The rear end of lever 6, which is marked 6$^a$, carries escapement pawls 7 and 7$^a$ coöperating with an escapement wheel 8 arranged on a vertical shaft 9. The operation of the escapement mechanism is clearly shown in Figs. 6, 7 and 8, wherein it will be seen that when the rear end 6$^a$ of lever 6 is raised, upon the depression of a key, the escapement pawl 7$^a$, whose face is slightly in front of the face of the pawl 7, is brought in front of one of the teeth of the escapement wheel 8 and permits said wheel 8 to rotate slightly, possibly the distance of half of one of the escapement teeth. This locates the pawl 7 on top of the escapement tooth, and when the key 3 is released a spring 6$^b$, connected to the rear arm 6$^a$ of the escapement lever, will pull the arm 6$^a$ down, causing the pawl 7$^a$ to drop beneath and release the escapement tooth, the pawl 7 being thrown in front of the next escapement tooth.

From the above it will be seen that the movement of the escapement wheel occurs after the digit key has been released, and, except for the slight movement incident to the difference between the operating faces of the pawls 7 and 7$^a$, it may be said that the escapement wheel remains stationary during the time that a digit key is being depressed. The inner faces of the pawls 7 are preferably beveled, and these pawls are held in normal position by a connecting spring 7$^b$, the normal position of the pawls being determined by a bent end 6$^c$ of the escapement lever. When the escapement wheel is restored to its home position, these pawls 7 and 7$^a$ may be vibrated to permit the teeth on the escapement wheel 8 to pass therethrough. The escapement wheel 8, as shown in Fig. 8, is mutilated, that is, said wheel has a blank untoothed space so that it is possible for the escapement wheel to be reversely rotated beyond its starting position, for purposes which will hereinafter be described.

*The traveling carriage.*—Shaft 9 to which the escapement wheel 8 is fixed, carries at its upper end a gear 10 meshing with a rack 11 mounted on the underside of a slide bar carriage 12. The carriage 12 is provided with rollers 13 operating upon tracks 14 supported by the side frames 2. A spring drum 15 is connected by a cable or flat steel tape to the carriage 12, see Fig. 9, and tends at all times to pull the carriage 12 toward the left, looking from the front of the machine. The spring drum 15, when permitted to do so, restores the carriage to operative position, in which the face of the pawl 7 engages the first escapement tooth.

*Releasing the slide bars.*—Coincident with the positioning of one of the stops 18, the depression of the escapement bar 6 will cause a lug 20, mounted in a suitable arm pivoted at the rear end of the guide 19, to be depressed by reason of a link connection between said arm and the escapement bar 6 through the medium of the link 21. This lug 20 coöperates with the finger 22 of a locking detent 23, which detent is designed to engage notches preferably in the form of ratchet teeth on the underside of the slide bars. The detents 23 are mounted in suitable bracket extensions arranged on the carriage 12, appropriate springs being provided to coöperate with said detents to force them into engagement with the teeth of the slide bars. There is an individual detent for each slide bar in the carriage. As the lug 20 is depressed, the detent 23 releases its complementary slide bar and permits said slide bar, which is marked 24, to move forwardly under the impelling action of a spring 25, until arrested by one of the positioned stops 18. When the digit key, or the zero key, as the case may be, is released, the lug 20 is also released so that the detent 23 engages the proper tooth of the slide bar to hold said slide bar in the position in which it was arrested by the stop 18. In order that this release and reëngagement of the slide bar by the detent 23 may occur in proper time relation to the movement of the digit key and its operated stop 18, a clearance space is left between the lug 20 and the finger 22 of the detent, which clearance space is also necessary to permit the lateral movement of the detent with respect to said lug.

It will be noticed that a stop 18 must be raised and in position to arrest a slide bar before the detent 23 is operated to release the slide bar, and when the digit key starts to rise the stop 18 will start to move downwardly, but before the stop 18 is housed in its guide-way the detent 23 will have reëngaged its slide bar so as to lock the same in its arrested position, the final movement of the lug 20, after it has released the finger 22, in reaching its clearance position, being consumed in finally housing the stop 18.

The operation of the above-described parts of the machine will undoubtedly be understood from what has been said, but to recapitulate briefly it may be said that when any of the digit keys are pressed the slide bars 24 will move forwardly until arrested by the stops 18, the carriage 12 being held practically stationary during this operation; that when the key is released the detent 23 will reëngage with its positioned slide bar before the stop 18 is retracted, and before the escapement pawl 7ᵃ has released the escapement wheel 8; consequently the positioned slide bar is locked in its forward position before the carriage 12 takes a step toward the left, and that the final upward movement of the digit key, will depress the pawl 7ᵃ so that the carriage will take one step to the left, placing under the control of the stops 18 the next adjacent slide bar to be positioned in a like manner upon the operation of another digit. The successive depressions of the digit keys or of the zero key, as the case may be, will successively advance the carriage step by step toward the left until the number to be introduced into the register wheels has been struck on the keys, when the parts are in readiness for the handle-pull.

*The rack bars.*—26 indicate the rack bars which are guided in their movement in any suitable manner, those shown in the drawings being provided with slots through which pass supporting rods 27. These rack bars carry independently movable type 28 at their forward ends, the foremost of which type bears the zero character, and the remainder figure characters from "1" to "9" inclusive. Normally the zero character is in printing line under a platen 29, which platen supports a sheet of paper.

Any appropriate paper-feeding devices may be employed in connection with the platen 29, and means may also be used to adjust this platen laterally so as to print different columns on the same sheet of paper supported thereby, in a manner well known in this art, if such is desired. Each of the rack bars 26 is impelled forwardly by a spring 30 connected thereto. A pawl or lipped plate 31 mounted on a rock shaft 32 and common to all of the depending fingers on each rack bar, prevents forward movement of the rack bars. When the shaft 32 is rocked so as to depress the common restraining plate or pawl 31, the rack bars are released and may be moved forwardly.

33 is a restoring bar located in front of the depending extensions of the rack bars, and which restoring bar also prevents forward movement of the rack bars except when the operating rod, to which the restoring bar 33 is connected, is moved forwardly.

The rack bars 26 are provided with rack teeth which are designed to mesh with the register wheels, and each rack bar is also provided with a notch into which fits a pawl identified with the printing mechanism to be hereinafter described.

As the restraining plate or pawl 31 is common to all of the rack bars and, when operated, will release all of the rack bars simultaneously, it is obvious that some means must be provided to permit only those rack bars to move forward which are active, that is, which are identified with the orders comprehended by the number introduced into the machine through the keys. Thus if the first and second rack bars at the right were identified with the cents and dimes columns, and the remaining rack bars toward the left were identified with the units dollars, tens of dollars, hundred of dollars, etc., columns, it is obvious that if $5.25 were introduced into the machine through the key board, which is equal to 525 units, the first three slide bars 24 at the left would be positioned in the fifth, second and fifth positions, respectively, in the paths of the first three rack bars at the right. When the operating handle is pulled the restraining pawl or plate 31 is depressed so as to release all of the rack bars, and the restoring bar 33 moving forwardly with the operating handle will permit all of the rack bars to move forwardly, the first three bars at the right will permit it being arrested at the fifth, second and fifth positions, respectively, while the other rack bars would, if means were not provided to prevent them, move to the ninth position. The traveling carriage is, therefore, provided with pivoted arms 34, see Figs. 2 and 9, which arms carry a rod 35 having a plate $35^a$ normally located in front of the depending projections at the rear ends of the rack bars. Thus, if the carriage 12 is advanced three spaces toward the left, the plate $35^a$ will be moved a corresponding distance and will release the first three rack bars at the right, but will occupy a position in front of the remaining rack bars; thus, notwithstanding the release of the rack bars by the pawl 31, and the forward movement of the restoring bar 33, the plate $35^a$ will prevent all the rack bars of higher order from moving forwardly. It will, of course, be understood that when the traveling carriage is home the plate $35^a$ lies in front of the depending projections of all of the rack bars. When, however, the plate $35^a$ advances one step with its positioned slide bar, the plate $35^a$ will release the first slide bar at the right and successively releases other slide bars of higher order as the carriage advances.

In view of the fact that the plate $35^a$ is carried by the carriage 12, it will be obvious that when said carriage is restored the plate $35^a$ might, by the restoring movement of the carriage, be moved behind the depending projections of the rack bars 26. To permit the rack bars to be restored in their proper time relation to the other parts of the machine it is preferred to hinge the lower portion of these depending projections of the rack bars, such hinged portions $26^a$ being connected to the rack bars by a rule or elbow joint which permits of forward movement but prevents backward movement. Should any of the rack bars not be restored at the time the plate $35^a$ moves to a position behind them, it will be seen that the hinged portion $26^a$ will yield and permit full restoration of the rack bars. Should the rack bars be in position to interfere with the movement of the plate $35^a$, then said plate will yield until the rack bars are fully restored, when spring $35^b$, connected to the bar 35, will cause the plate $35^a$ to move into position in front of the hinged portion of the rack bars. The springs which hold the hinged portions of the rack bars in position are sufficiently strong to cause the said hinged portions to depress the pawl 31, and said springs will yield when said hinged portions ride over the plate $35^a$. The bar 35 is preferably square so that it is permitted longitudinal movement in its bearings, but prevented from rotating.

*The operating bar.*—Referring to Figs. 9 to 12 inclusive, 36 indicates an operating bar mounted in suitable bearings on one of the side frame plates 2, preferably the right-hand frame plate, but it is obvious that this bar and its carried handle could be on the left-hand side of the machine if desired. This bar 36 is provided with keys fitting in key-ways therein and in its bearings, which keys permit longitudinal movement of the bar but prevent any rotary motion being imparted thereto. The restoring bar 33 is supported by the bar 36, preferably at its rear end. A spring $33^a$ is coiled about the bar 36 in advance of the bar 33, so that said bar 36 may have a slight extra movement after the rack bars have been restored to their full home position by the restoring bar 33, which extra movement is necessary to disengage the register wheels from the rack bars, and which disengagement must occur after the rack bars are stationary and at home. A stop pin $33^b$ is provided on the bar 36 to determine the fixed position of the restoring bar with respect to the bar 36, and some appropriate means must, of course, be provided, such as a key in the bearing of the restoring bar, to support the restoring bar in its horizontal position and yet permit a slight movement of said restoring bar longitudinally the bar 36. Bar 36 also has a yielding latch spring 37 which coöperates with a stud or pin 38 on the rock shaft 32, whereby as the bar 36 moves forwardly the restoring bar 33 is permitted a slight independent movement before the shaft 32 is rocked and the selected rack bars released. A spring $32^a$ on the rock shaft causes the pawl 31, after the selected rack bars have been released, to assume its normal position, and on the rearward movement of the bar 36 the latch spring 37 yields with respect to the pin or stud 38, and thus enables the latch spring to pass behind the pin or stud in readiness for another operation. Bar 36 is provided with a handle 39 designed to be grasped by the operator, which handle has a slight rotary movement on the bar and is normally held in its forward position by means of a spring 40, which spring tends to pull the bar 36 back to its home position after operation. The side frame 2, as shown in Fig. 1, is slotted for the passage of the operating handle 39, and the rear upper edge of the slot is formed with an enlargement into which the handle 39 operates, giving the handle a slight upward movement as it approaches its home position. In pulling the handle forward the operator slightly depresses the same in order that it may pass the shoulder occasioned by the enlargement.

*Restoring the slide bars.*—Bar 36 carries a rod 41, on which is arranged a swinging bail consisting of side members 42 and a cross bar preferably in the form of a roller 43. One of these side members, see Figs. 1 and 10, (the one nearest the frame plate 2), is provided with a heel portion 42ª which coöperates with a pin 42ᵇ arranged in the frame plate 2, and whenever the bar 36 is home the bail 42 is rocked and the roller 43 elevated out of the paths of the slide bars 24. When, however, the bar 36 is moved forwardly the heel portion 42ª leaves the pin 42ᵇ, and the roller 43 carried by the free end of the bail is free to ride on the slide bars in its forward movement, and drop in front of the positioned slide bars 24 when in its forward position, so that when the bar 36 is moved rearwardly to its home position all of the positioned slide bars 24 will be moved rearwardly by the roller 43 and restored to normal position, the detents 23 yielding to permit this. When the bar 36 is home, the heel portion 42ª is in engagement with the pin 42ᵇ and the roller 43 is lifted out of engagement with the slide bars 24, as shown by dotted lines in Fig. 10. Of course, when the repeat key is operated means are provided to prevent this restoring bail from restoring the slide bars, as will hereinafter appear.

*Restoring the traveling carriage.*—Referring to Fig. 17, it will be observed that the gear wheel 10 at the upper end of the escapement shaft 9 meshes with a rack 44, which rack is held in position and guided by slot and pin connections, the pins being supported by the track rods 14. Rack 44 is connected to a plate 44ª supported by suitable rollers mounted on the side frame 2, which plate 44ª is provided with ratchet teeth 44ᵇ at its rear edge.

45 indicates an extension carried by the bar 36, upon the lower end of which extension is arranged a gravitating pawl 46. A pin 47 is arranged in the frame plate 2 so as to engage the upper face of pawl 46 and raise said pawl out of engagement with the teeth 44ᵇ. Thus, when the bar 36 is home and the pawl 46 is raised, the gear wheel 10 may rotate step by step, advancing the carriage 12 to the left and the plate 44ª forwardly, the teeth 44ᵇ moving under the pawl 46.

Whether the carriage is stepped once to the right or up to the full capacity of the machine, which in this instance is 9,999,-999.99, nine orders meaning that the carriage may be stepped to nine different positions leftwardly, the plate 44ª will be stepped forwardly proportionately, and, regardless of the position of the carriage or plate, the pawl 46 will be released when the bar 36 is moved forwardly, and will, at the extreme forward position of bar 36, engage one of the nine different ratchet teeth 44ᵇ. When the bar 36 is moved rearwardly, the pawl 46 in engagement with one of the teeth 44ᵇ will restore the plate 44ª and rotate the gear 10, which in turn is meshed with the rack 11 on the carriage 12, and consequently the rearward movement of bar 36 will restore the carriage 12 to its home position. As the bar 36 approaches its home position and after the carriage 12 has been fully restored, the pawl 46 is elevated, as shown in Fig. 1, whereupon a slight excess movement imparted to the carriage in restoring it home, to take up possible wear or lost motion in the parts, will be absorbed by the spring drum 15 which moves the escapement wheel 8 so that its first tooth will engage the escapement pawl 7, the blank in the escapement wheel being provided for this purpose as heretofore referred to.

*Register mechanism.*—The gear wheels comprising the register mechanism are normally out of mesh with the racks 26, but after the racks have been positioned by the slide bars 24 it is necessary to engage these register wheels with the racks so that when the racks are restored by the restoring bar 33 the gear wheels will be rotated a distance of one or more teeth depending upon the position of the rack bars. Each register gear wheel has twenty teeth, and according to the decimal system when a number exceeding "9" has been introduced into any gear wheel means must be provided for carrying from a gear wheel of lower order to a gear wheel of higher order. This will be described later.

49 indicates the register gear wheels, each gear wheel being loosely mounted on a stud shaft carried by a plate or bar 50. The ends of each plate 50 are provided with slots, through the rearmost of which passes a bar 51 supported from the side frames 2, and which bar acts as a pivot on which plates 50 may swing.

52 indicates a rock shaft carrying a bail formed in part by a rod 53 which passes through the slots in the forward ends of the plates 50. Suitable washers may be strung on the rods 51 and 53 for the purpose of spacing the plates 50 a proper distance apart and preventing their displacement. The plates 50, however, are left free so as to move forwardly or backwardly in effecting the carrying. Rod 52 is provided at one end with a rock arm 70 which is connected by a link 69 through a slot and pin connection to an arm 71 on a stud shaft 72. Rod 72 is provided at one end with a tappet 52ª, see Fig. 10, which tappet coöperates with projections 52ᵇ and 52ᶜ on the operating bar 36. When the operating bar is moved forwardly as shown in Fig. 10 the rearmost projection 52ᶜ engages the tappet 52ª and rocks the shaft 52 so as to raise the forward ends of plates 50 and cause the register wheels to mesh with the racks. The gear wheels remain in mesh with the racks until the operating rod 36 approaches its rearmost position, at which time the projection 52$^b$ engages the tappet 52$^a$ and disengages the register gear wheels from the racks.

Means are provided for insuring full movement of the shaft 52 in elevating or depressing the register gear wheels as the case may be, and these means, as shown in Fig. 1, consist of a notched segment 53$^x$, preferably arranged outside the frame plate 2, which notched segment coöperates with a spring 54 and also with a spring-pressed centering pin 55. In the position shown in Fig. 1, the bar 36 is home, and as the bar is moved forwardly the projection 52$^c$ engages the tappet 52$^a$ and positively rocks the segment until the spring 54 has passed a position of dead centers, when said spring will then utilize its energy to raise the register gear wheels into engagement with the racks, in which position the centering pin 55 will be located in the forward notch of segment 53$^x$. The reverse action takes place when the operating bar is moved rearwardly and the projection 52$^b$ coöperates with the tappet 52$^a$.

*Carrying mechanism.*—As stated before, whenever any register wheel is rotated by its coöperating rack a distance of ten teeth or more, means must be provided for carrying from the next adjacent wheel of higher order. This is accomplished by providing each register wheel, except the one of highest order, with two tripping projections 56. It will, of course, be understood that if the register wheels had ten teeth there would be but one of these tripping projections; or if the register wheels had thirty teeth there would be three of these tripping projections, said tripping projections being located at every tenth tooth.

57 indicates a tripping pawl mounted on the plate 50 which carries the register wheel, with whose tripping projection said tripping pawl 57 coöperates. As the tripping projection passes this tripping pawl it depresses its forward end and raises its rear end, which rear end is located under a projection 58 of a restraining pawl 59. These restraining pawls are mounted on a cross bar 60, and each restraining pawl is held with its rear end depressed by means of a spring 61, which spring is also connected to a plate 50 so as to move said plate 50 forwardly. Each plate 50, with the exception of the one at the extreme right looking from the front of the machine, is provided with a projection or shoulder 62 which normally lies behind the rear end of the restraining pawl 59. Whenever the tripping pawl 57 is operated by a tripping projection its coöperating restraining pawl 59 is lifted, which releases the plate 50 carrying the next adjacent register wheel of higher order, and the spring 61 moves said plate and its register wheel forwardly a distance permitted by the slots in the ends of said actuated plate. As the plates 50 are tripped only when the register wheels are in mesh with the racks, it will be observed that the movement of plate 50 will cause its carried gear wheel to rotate, and the rotative movement thus imparted to the gear wheel is equal to the distance of one tooth.

From the above it will be seen that the displacement of the plate 50 and its carried register gear wheel may occur either when said register wheel is in mesh with a stationary rack or a moving rack, during the period of restoration of said rack. This, however, will not affect the relative displacement between the wheel and the rack, and whether the rack is stationary or moving the wheel will eventually either rotate itself, if the rack is stationary, or be rotated by the rack a distance of one tooth in excess of the movement imparted to the wheel, should the rack be moving. Thus at all times the register wheels stand fully carried, and it is not necessary, as in some types of machines which have been on the market, to impart an extra stroke to the handle to effect the operation of carrying. In fact, it would be possible to obtain a correct total from the register wheels without replacing the register wheels to their original positions as the zero-determining element, to wit, the tripping pawls 57, move with their respective register wheels, and the register wheels when meshed with the racks to yield a total would insure proper movements of the racks irrespective of the fact that the register wheels might stand displaced at the time the total was taken. However, it is preferred to replace the register wheels to their original positions after they have been disengaged from their respective racks, and at the end of the rearward movement of the operating bar 36, and this is accomplished by means of the rock shaft 41 heretofore described, which rock shaft, or a sleeve 41$^a$ on the rock shaft, engages with depending projections on the forward ends of the plates 50 and restores any displaced plates 50 to their original position. This is permissible because the tripping projections 56 on the register wheels are tapered to a point, and after operating the tripping pawls 57 said pawls and their controlled restraining pawls, assume their normal position.

To prevent movement of the register wheels when out of mesh with their respective racks, I mount locking devices 63 on the plates 50, the forward ends of which locking devices are slotted and held in proper position by the bar 64 supported from the side frame plates 2. A tooth 63$^a$ is arranged at the forward ends of each locking device so as to engage its complementary register wheel. The object in providing a separate locking device for each wheel is to lock said wheels against movement when disengaged from their racks, notwithstanding the fact that said wheels may at the time be displaced. This locking device, moving with the wheel, will, of course, keep the wheel locked, not only while it is displaced but during the time it is being replaced and after it has been replaced, and while it is still out of engagement with the racks.

*Taking a total.*—Referring to Figs. 1 and 18, 65 indicates a total key or lever which is preferably mounted in the bracket bearing 4. This total key coöperates with a bell crank lever 66, which in turn is connected to a link 67. Link 67 is connected by a slot and pin connection to a bell crank lever 68, in turn connected by a slot and pin connection to the link 69 heretofore described.

By referring to Fig. 1 it will be observed that in the ordinary operation of the machine the slot in the lower end of link 69 permits the link 69 to be vibrated without disturbing the lever 68. When the register gear wheels are out of mesh the pin in the end of bell crank lever 68 is located at the upper end of the slot, and thus link 69 can be raised independently of the bell crank lever 68. When the total key is depressed and the rearwardly extending member of bell crank lever 68 is raised, the link 69 will be raised with it so as to cause the register gear wheels to mesh with the rack bars. This upward movement, however, of link 69 does not disturb the position of the rock arm 71, the tappet 52ª or the notched segment 53. Again referring to Fig. 1, where the parts are shown in normal position, it will be observed that the pin carried by the slot in the end of arm 71, which slot is necessary on account of the arcuate movement of the arm, the lower end of the link 69 being connected to the bell crank lever 68, normally occupies a position at the upper end of the slot in the link 69 in readiness to directly operate said link when said arm 71 moves upwardly and in a position to permit the link 69 to move upwardly without operating said arm 71, as when said link is operated by the bell crank lever 68. By this construction, in the normal operation of the machine, as in introducing examples into the register, the register is thrown into engagement with its racks at the extremity of the forward movement of the bar 36, and out of engagement with its racks at the extremity of the rearward movement of the bar. However, in taking a total, it is necessary to throw the register into engagement with the racks before the bar 36 is moved forwardly, and this is done by the mechanism above described. When the register is in engagement with the racks by operating the total key as above described, and the bar 36 is moved forwardly, it will be seen that the register wheels will be reversely rotated until the tripping pawls 57 come in contact with the tripping projections 56, at which time all the register wheels will stand at zero, and the rack bars will indicate the total registered in the register. The type in the printing line will be positioned to print this total when the type hammers are released as the bar 36 approaches the forward limit of its movement.

*Clearing the machine.*—If it is desired to clear the machine it is only necessary, after pressing the total key down, and pulling the bar 36 forwardly, to release the total key when the bar 36 is in its forward position, when the register wheels will be disconnected from their respective racks. The tappet 52ª, as shown in Figs. 12 and 12ª, is pivotally mounted in the end of the stud shaft 71, and its lower end is lifted by a projection 68ª on the bell crank lever 68 when said bell crank lever is raised. Thus, when the bell crank lever 68 is operated, the tappet 52ª is thrown out of the path of the projection 52ᶜ, as shown in Fig. 12ª, and the bar 36 may be pulled forwardly and not rock the stud shaft 72. The release of the total key, when the rod 36 is in its forward limit of movement, likewise releases the tappet 52ª, which is returned by a spring 52ᵈ to its normal position. When the projection 52ᶜ is in the path of the tappet, it is obvious that the spring will yield and restore the tappet to normal, operative position, after the handle bar 36 starts on its backward movement. By disengaging the register wheels from the rack bars, when the handle bar 36 is forward, all of the register wheels stand at zero, and the rack bars may be returned to normal position, without actuating said register wheels.

*Retaining the total in the machine.*—To retain the total in the machine it is only necessary to hold the total key down, and by so doing keep the register wheels in mesh with their respective racks during the backward movement of the bar 36, which will result in causing the racks to operate the register wheels to the position they occupied before the sub-total was printed.

*Releasing the rack bars and obtaining a total.*—As it is necessary to release all of the rack bars in taking a total, the bracket arm 34 which carries the bar 35 is pivotally mounted as shown, and an extension 73, see Fig. 18, from said bracket arm 34 coöperates with the cam face on the link 67, and when said link is moved rearwardly its cam face engaging the part 73 depresses the rod 35 and permits all of the rack bars to move forwardly. Link 67 is also provided with a slot in its rear end which engages the pin on a rock arm 32ᵇ on rock shaft 32, and by rocking said shaft depresses the pawl 31 out of engagement with the rack bars and holds said pawl in its depressed position. If any of the register wheels stand at zero at the time a total is being taken, it will of course be obvious that the tripping pawls 57 are behind the tripping projections 56, and consequently said wheels cannot be rotated, nor can the racks with which said wheels standing at zero engage, be moved forwardly.

*Repeating.*—To repeat a number, that is, after a number has been introduced into the machine through the key board to add said number in the register a number of times, a repeat key 74 arranged adjacent the operating handle 39 is depressed. This repeat key (see Fig. 11) is mounted on the bar 36 and is capable of slight rotation on said bar. Key 74 is only operated after an example has been set up in the machine and the traveling carriage has been advanced to the left with its slide bars properly positioned and locked in position as herein before described. When the carriage is so advanced and it is desired to successively register the number in the register wheels indicated by the slide bars in the carriage, it is only necessary to prevent restoration of the slide bars 24 and the carriage 12, and this is accomplished with respect to the former by means of a finger 75 which coöperates with one of the bail pieces 42 and holds the restoring bar 43 in its elevated position, so that it cannot restore the slide bar 24 to position; and with respect to the latter, a pivoted member 76 connected to the repeat key bears upon the forward end of pawl 46 so as to hold said pawl in its raised position out of engagement with the teeth 44ᵇ. Thus when the repeat key is depressed, neither the slide bars 24 nor the carriage 12 can be restored, and consequently as long as the repeat key is held depressed and the bar 36 operated, the number indicated by the slide bars may be registered a desired number of times in the register wheels, depending upon the number of strokes imparted to the bar 36.

*Printing mechanism.*—The printing type are provided with light springs, not shown, to return them to their normal or lower position after a printing impression. Each rack is provided with a notch on its under side with which coöperates a selecting and restraining pawl 77. The rear end of this restraining pawl, when the rack bars are home, engages one member of a bell crank lever 78 whose forward member carries a pin 79 resting upon the tail-piece 80 of the type hammer 81. Springs 82 are connected to the forward member of the bell crank lever so as to draw the same down whenever the rear member thereof is released by the restraining pawl 77. Each type hammer is provided with a pin or projection 83 which coöperates with the hooked end of a bell crank lever 84 which is held in its engaged position by a spring 85. This bell crank lever has a rearward extension 86. Mounted on the shaft on which the bell crank levers 78 are mounted, is a rock arm 87, said rock arm carrying a bar 88 which lies under all of the rearwardly extending projections 80 of the type hammers, said bar traveling in a path which comprehends all of the rearwardly extending projections 86 of the type hammer pawls. The arms 87 carry a rod 89 to which one end of the hammer-actuating springs 82 is connected.

In operation, whenever a rack bar moves forward the rear end of the restraining pawl 77 is raised out of engagement with the member 78 of the bell crank lever, and consequently the pin 79, under the impelling action of the springs 82, bears upon the rearward extension 80 of the type hammers. As the operating handle moves forward and after all of the rack bars are positioned, the bars 88 and 89 are depressed, the latter increasing the tension of the springs 82, and the former eventually striking the projections 86 and lifting all of the hooked pawls 84 out of engagement with the printing hammers. In this manner any of the printing hammers which may have been released by restraining pawls 77 are thrown up against the type, forcing the type to make a printing impression on the paper supported by the platen 29. As the bar 88 returns to its normal position it will restore all of the actuated type hammers to normal position, reëngaging the hooked pawls 88 therewith, and at the same time swing all of the bell crank levers through the pins 79 so as to place the rear members of said bell crank levers to a position to be engaged by the restraining pawls 77 when the rack bars are restored home.

The means for vibrating the arms 87, which arms carry the bars 88 and 89, consists of a rock arm 90 on the end of the rock shaft 91 to which said arms 87 are connected. This rock arm 90 is provided with a lateral projection which coöperates with a hook 92 carried by the operating bar 36. When the bar 36 approaches the forward limit of its movement this hook 92 engages the projection on the rock arm 90 and rocks the shaft 91. When the operating bar 36 is restored to its normal or home position a projection 92ᵃ thereon engages the projection on the rock arm 90 and reversely rocks said arm to restore the type hammers to normal position.

In view of the fact that when the zero key is operated it sets up a stop which prevents any movement of a rack bar, it will be obvious that the zero type on said bar which is thus held stationary in printing line will not print unless the printing hammer identified with said bar is released. This is accomplished by means of a series of bent lips 93 which are provided at the rear upper edges of the restraining pawls 77. The lips of the several restraining pawls overlap their adjacent companions in the next higher order, and consequently if any pawl of higher order is released by its rack bar moving forward, said pawl will operate its companion in the next lower order, and said companion will in turn operate the pawl in the next adjacent order, and so on, releasing all of the pawls 77, and consequently permitting all of the printing hammers controlled by said pawls to be operated to the right of any actuated rack bar. The construction and operation of this printing mechanism is not claimed in this application as the same forms a part of an application filed by Hubert Hopkins April 9, 1906, Serial No. 310,739.

*Excessive movement of the operating bar.*—As the operating bar must positively move the tappet 52ª so that the register wheels will be thrown into and out of mesh with their actuating devices, to wit, the rack bars, after said rack bars have been forced fully home, the restoring bar 33, as before described, is made slightly yielding which permits an excess backward movement being imparted to the bar 36, and during this excess movement of bar 36 the register wheels are disengaged from their rack bars.

Having thus described the invention, what is claimed as new and desired to be secured by Letters Patent is:

1. In a calculating machine, the combination with key-positioned stops, of a traveling carriage, slide bars on said carriage, and means for individually releasing said slide bars as they are successively brought under control of said stops by the travel of the carriage; substantially as described.

2. In a calculating machine, the combination with key-positioned stops, of a traveling carriage, spring-pressed slide bars on said carriage, and means for individually releasing said slide bars as they are successively brought under control of said stops by the travel of the carriage, whereby said slide bars move forwardly under the impelling action of their springs until arrested by the positioned stop; substantially as described.

3. In a calculating machine, the combination with key-positioned stops, a spring-impelled traveling carriage, an escapement mechanism for controlling the movement of said carriage, slide bars on said carriage, and means for individually releasing said slide bars as they are successively brought under control of the stops by the travel of the carriage, said means also actuating the escapement mechanism for the carriage; substantially as described.

4. In a calculating machine, the combination with key-positioned stops, of a traveling carriage, slide bars on said carriage, means for individually releasing said slide bars as they are successively brought under control of said stops by the travel of the carriage, and means for locking the slide bars in their arrested position; substantially as described.

5. In a calculating machine, the combination with key-positioned stops, of a spring-impelled traveling carriage, escapement mechanism for controlling the movement of said carriage, slide bars on said carriage, means for individually releasing said slide by the travel of the carriage as they are successively brought under the control of said stops whereby said slide bars move forwardly under the impelling action of their springs until arrested by the positioned stops, means for locking the slide bar in its arrested position, and actuating devices for the carriage escapement which are effective in permitting the movement of the carriage after the slide bar has been locked in its arrested position; substantially as described.

6. In a calculating machine, the combination with key-positioned stops, of a spring-impelled traveling carriage, slide bars on said carriage, individual restraining pawls for said slide bars, and means for actuating said restraining pawls so as to release a particular slide bar as it is brought under the control of the key-positioned stops; substantially as described.

7. In a calculating machine, the combination with key-positioned stops, of a traveling carriage, spring impelled tooth slide bars on said carriage, individual restraining pawls coöperating with the teeth of the respective slide bars, means for disengaging a restraining pawl identified with a slide bar as said slide bar is brought under the control of said stops, said means releasing said restraining pawl so as to permit its engagement with a tooth of its slide bar so as to lock said slide bar in position after the slide bar has been arrested by a positioned stop; substantially as described.

8. In a calculating machine, the combination with digit key bars, of crank shafts with which said key bars coöperate respectively, alined stop pins which are operated by said crank shafts respectively, and horizontally movable slide bars coöperating with said stop pins; substantially as described.

9. In a calculating machine, the combination with digit key bars, crank shafts with which said key bars coöperate respectively, alined stop pins, link connections between said stop pins and said crank shafts respectively, and horizontally movable slide bars coöperating with said stop pins; substantially as described.

10. In a calculating machine, the combination with digit key bars, stops which are respectively controlled by said key bars, a traveling carriage, slide bars on said carriage, and means for individually releasing said slide bars as they are successively brought under control of said stops; substantially as described.

11. In a calculating machine, the combination with digit key bars, stops which are positioned respectively by said key bars, a traveling carriage, escapement mechanism for controlling the movement of said carriage, slide bars on said carriage, restraining pawls coöperating with said slide bar, and means operated by a depressed digit key bar for positioning a stop, releasing a slide bar, and operating said carriage escapement mechanism; substantially as described.

12. In a calculating machine, the combination with digit key bars, stops which are positioned by said digit key bars, a traveling carriage, escapement mechanism for said carriage, spring-impelled slide bars in said carriage, a restraining pawl for each slide bar, means operated by the key bar to move a restraining pawl coöperating with a slide bar under control of said stops so as to release said slide bar after a stop is positioned, said means permitting said restraining pawl to again become engaged with its slide bar and lock said slide bar in its arrested position before the stop has been retracted, and means operated by the digit key bar for rendering the escapement mechanism effective so as to cause the travel of the carriage after the slide bar has been arrested and locked in its adjusted position; substantially as described.

13. In a calculating machine, the combination with a traveling carriage, slide bars arranged on said carriage, means for releasing said slide bars and permitting their movement to a predetermined position, and means for restoring said slide bars; substantially as described.

14. In a calculating machine, the combination with key-positioned stops, of a traveling carriage, slide bars on said carriage, means for individually releasing said slide bars as they are successively brought under control of said stops, and means for collectively restoring all of said slide bars to home position; substantially as described.

15. In a calculating machine, the combination with key-positioned stops, of a traveling carriage, slide bars on said carriage, means for individually releasing said slide bars as they are successively brought under the control of said stops, and a vibrating member which engages all of the positioned slide bars and collectively restores them to home position; substantially as described.

16. In a calculating machine, the combination with a traveling carriage, slide bars on said carriage, a restoring bail coöperating with said slide bars, a reciprocating member to which said restoring bail is connected, and means for vibrating said restoring bail so as to move it into and out of the paths of movement of said slide bars; substantially as described.

17. In a calculating machine, the combination with a traveling carriage, spring-impelled slide bars on said carriage, means for individually positioning and locking said slide bars in predetermined positions, a vibrating bail for collectively restoring said slide bars, and a reciprocating rod on which said bail is mounted; substantially as described.

18. In a calculating machine, the combination with a traveling carriage, escapement mechanism for controlling the movement of said carriage, and means for restoring said carriage to home position, said means comprising a rack and pinion mechanism, a toothed plate coöperating with said mechanism, a reciprocating bar, and a pawl on said reciprocating bar for coöperating with said toothed bar; substantially as described.

19. In a calculating machine, the combination with a traveling carriage, and means for restoring said carriage, said means comprising a toothed bar having movement incident to the movement of the carriage, a pawl normally out of engagement with the teeth of said bar, and a reciprocating bar on which said pawl is mounted, said reciprocating bar when moved causing the pawl to become engaged with said toothed bar; substantially as described.

20. In a calculating machine, the combination with a traveling carriage, of a toothed bar having movement incident to the movement of the carriage, a reciprocating bar, a pawl carried by said reciprocating bar, and means for holding said pawl out of engagement with said toothed bar when said reciprocating bar is in its home position, whereby the traveling carriage is permitted to move when the reciprocating bar is home, and when said reciprocating bar is in other than home position the pawl carried thereby engages said toothed bar; substantially as described.

21. In a calculating machine, the combination with a traveling carriage, slide bars mounted in said carriage, key-positioned stops for individually controlling the movement of said slide bars, stationarily-mounted rack bars, and means for releasing said rack bars for coöperation with said slide bars; substantially as described.

22. In a calculating machine, the combination with key-positioned stops, of a traveling carriage, slide bars on said carriage, means for individually releasing said slide bars as they are successively brought under control of said stops, stationarily-mounted rack bars, and means for releasing said rack bars so that they will coöperate with said slide bars; substantially as described.

23. In a calculating machine, the combination with key-positioned stops, of a traveling carriage, slide bars on said carriage, means for individually releasing said slide bars as they are successively brought under control of said stops, means for restoring said slide bars, stationarily-mounted rack bars, means for releasing said rack bars so that they will coöperate with said slide bars, and means for restoring said rack bars independently of the restoration of said rack bars; substantially as described.

24. In a calculating machine, the combination with totalizer wheels, of rack bars coöperating therewith, slide bars for coöperating with said rack bars, means for laterally moving said slide bars step by step so as to progressively position said slide bars in the paths of movement of said rack bars; substantially as described.

25. In a calculating machine, the combination with a totalizer, of actuating racks therefor, slide bars which are progressively advanced in the paths of movement of said actuating racks, and means for positioning said slide bars before they occupy a controlling position with respect to said actuating racks; substantially as described.

26. In a calculating machine, the combination with a totalizer, actuating racks therefor, slide bars for controlling the position of said racks, means for progressively moving said slide bars in the paths of movement of said racks, and means for preventing movement of all racks having no complementary slide bars; substantially as described.

27. In a calculating machine, the combination with a totalizer, actuating racks therefor, slide bars which are progressively advanced in the paths of movement of said actuating racks, key-positioned stops, and means for individually releasing said slide bars as they are successively brought under control of said stops; substantially as described.

28. In a calculating machine, the combination with a totalizer, actuating racks therefor, slide bars which are progressively advanced in the paths of movement of said actuating racks, a carriage in which said slide bars are mounted, escapement mechanism for said carriage, key-positioned stops, and means for individually releasing said slide bars as they are successively brought under control of said stops and before they take a controlling position with respect to said actuating racks; substantially as described.

29. In a calculating machine, the combination with a totalizer, actuator racks therefor, sliding rack bars, means for progressively moving said slide bars into controlling position with respect to the actuating racks, means for successively releasing said actuating racks as the slide bars progress, means for restoring said racks, and independent means for restoring said slide bars; substantially as described.

30. In a calculating machine, the combination with a totalizer, of actuating racks therefor, means for successively releasing said racks, and a hinged portion on each rack for coöperating with said releasing means; substantially as described.

31. In a calculating machine, the combination with actuating devices, of independently movable supports, a totalizer having register wheels which are operated by said actuating devices and carried by said supports, and means for moving said supports and their carried register wheels; substantially as described.

32. In a calculating machine, the combination with actuating devices, of independently movable supports, totalizer wheels operated by said actuating devices and carried by said supports, tripping projections on said totalizer wheels, and means under control of said tripping projections for effecting the movement of said supports and their carried wheels in performing the operation of carrying; substantially as described.

33. In a calculating machine, the combination with actuating devices, of independently movable supports, totalizer wheels operated by said actuating devices and carried by said supports, tripping projections on said totalizer wheels, means under control of said tripping projections for effecting the movement of said supports and their carried wheels in performing the operation of carrying, and means for restoring said wheels; substantially as described.

34. In a calculating machine, the combination with actuating devices, of independently movable supports, totalizer wheels carried by said supports and operated by said actuating devices, tripping projections on said totalizer wheels, means under control of said tripping projections for effecting the movement of said supports and their carried wheels in performing the operation of carrying while said wheels are in engagement with said actuating devices, and means for restoring said wheels while they are out of engagement with said actuating devices; substantially as described.

35. In a calculating machine, the combination with actuating racks, of register wheels for coöperating with said racks, each of said register wheels being displaceable in the direction of movement of said racks, and means for displacing said register wheels whereby carrying is effected; substantially as described.

36. In a calculating machine, the combination with actuating devices, register wheels, and carrying mechanism, which carrying mechanism comprises means for bodily displacing said register wheels; substantially as described.

37. In a calculating machine, the combination with actuating devices, a totalizer comprising displaceable wheels, plates on which said wheels are independently mounted, yielding means for moving said plates in either direction, retaining means for preventing the movement of said plates, and tripping projections on the register wheel of lower order for releasing said restraining means and permitting the bodily movement of the next adjacent wheel of higher order; substantially as described.

38. In a calculating machine, the combination with actuating devices, of a totalizer comprising displaceable wheels, plates in which said wheels are independently mounted, springs exerting pressure to move said plates in one direction, restraining pawls for preventing the movement of said plates, tripping pawls, and tripping projections on the wheels for operating said tripping pawls and releasing the restraining pawl identified with the plate which carries the next adjacent wheel of higher order; substantially as described.

39. In a calculating machine, the combination with actuating devices, of independently movable supports, totalizer wheels, and locking detents for said wheels, said wheels and said detents being mounted upon said supports; substantially as described.

40. In a calculating machine, the combination of actuating devices, displaceable register wheels, and locking detents for coöperating with said register wheels in normal and displaced position; substantially as described.

41. In a calculating machine, the combination with actuating devices, independently movable supports, totalizer wheels, operated by said actuating devices, locking detents for said totalizer wheels, said wheels and said detents being mounted upon said supports whereby said detents coöperate with said wheels in the normal and displaced positions of said wheels, and means for restoring any displaced totalizer wheel to normal position; substantially as described.

42. In a calculating machine, the combination with actuating devices, displaceable register wheels, means for locking the displaced and normal wheels against rotation when out of engagement with said actuating devices, and means for restoring said displaced wheels while they are locked; substantially as described.

43. In a calculating machine, the combination with a totalizer, actuating devices therefor, a reciprocating rod for operating said actuating devices, an operating handle on said rod, and a repeat key on said rod; substantially as described.

44. In a calculating machine, the combination with a traveling carriage, slide bars on said carriage, racks whose movements are controlled by said slide bars, a totalizer, a reciprocating rod, means on said rod for restoring said slide bars, said actuating racks and said carriage, and a handle on said rod; substantially as described.

45. In a calculating machine, the combination with a traveling carriage, slide bars on said carriage, an escapement mechanism for said carriage, operating means, restoring devices for said slide bars, and said carriage operatively connected to said traveling carriage, and a repeat key on said operating means for rendering said restoring devices inoperative; substantially as described.

46. In a calculating machine, the combination with a traveling carriage, slide bars on said carriage, rack bars under the control of said slide bars, a totalizer in coöperative relation with said racks, means for releasing only the slide bars which are in coöperative relation with said slide bars in the ordinary operations of the machine, a total key for operating said releasing means to release all of the rack bars in the operation of taking a total; substantially as described.

47. In a calculating machine, the combination with key-positioned stops, a traveling carriage, slide bars on said carriage, means for individually releasing said slide bars as they are successively brought under control of said stops, rack bars whose movements are controlled by said slide bars, and printing type carried by said rack bars; substantially as described.

48. In a calculating machine, the combination with a totalizer, actuating devices therefor, printing type which are positioned by said actuating devices, a reciprocating handle bar for operating said actuating devices, printing hammers which are controlled by the movement of said bar; substantially as described.

49. In a calculating machine, the combination with a register, of actuating racks therefor, slide bars for controlling the position of said actuating racks, and means for moving said slide bars to different positions; substantially as described.

50. In a calculating machine, the combination with a register, of actuating racks therefor, slide bars for controlling the position of said actuating racks, means for moving said slide bars to different positions, keys, and means under control of said keys for determining the degree of movement of said slide bars; substantially as described.

51. In a calculating machine, the combination with actuating devices, of independently movable spring-held supports, totalizer wheels mounted on said supports, tripping projections carried by said wheels, and a restraining pawl for holding each support against the action of its spring, said tripping projections coöperating with said restraining pawl to release the support during the engagement between the totalizer wheels and said actuating devices, whereby said wheels are displaced in a direction opposite to the direction of movement of its engaged actuating devices to effect carrying; substantially as described.

52. A series of register wheels, an oscillatory frame on which each wheel is mounted to revolve, a spring on each arm constantly tending to oscillate the arm in one direction, and means adapted to move simultaneously against all of the arms to energize the springs.

53. A register wheel of lower order, an adjacent register wheel of higher order, a cam on the wheel of lower order, a rack adapted to engage each register wheel pinion, a bearing for each wheel, means for moving the bearing of the wheel of higher order, a latch adapted to detain it against movement, and means whereby when the cam on the wheel of lower order is rotated past the "9" by the movement of its rack, the latch is disengaged from the bearing of the wheel of higher order to permit the bearing to move the wheel of higher order against its rack one point, said means comprising an elbow having one arm engaging with the cam on the wheel of lower order and the other arm engaging with the latch of the bearing of the wheel of higher order.

54. In a machine of the character described, including a main shaft, register wheels arranged in series and adapted to be moved in unison, racks coöperating therewith, one for each wheel, means for moving the racks, means whereby the wheels as a series are moved into engagement with the racks, and means whereby the latter moving means are detained and released alternately and automatically to each vibration of the main shaft.

55. In a machine of the character described, including a main shaft, register wheels arranged in series and adapted to be moved in unison, racks coöperating therewith one for each wheel, means for moving the racks, means whereby the racks are normally detained against movement at the beginning of the vibration of the main shaft, means whereby the detaining means are released at the beginning of the vibration of the main shaft to permit the racks to move to an engaging position with the wheels, further means whereby the wheels are moved into engagement with the racks, and means for disengaging the wheels from the racks.

56. The combination with a key setting mechanism, of register wheels one for each denomination, devices for rotating them separately, means for moving them as a series away from the rotating devices and detents adapted to hold them at the positions to which they have been rotated after they are disengaged from the rotating devices.

In testimony whereof, I hereunto affix my signature in the presence of two witnesses, this 15th day of August, 1907.

FREDERICK R. CORNWALL,
*Administrator of the estate of Robert E. Wageley.*

Witnesses:
    CORA BADGER,
    LENORE WILSON.